(12) United States Patent
Vestergaard Frandsen et al.

(10) Patent No.: US 10,266,427 B2
(45) Date of Patent: Apr. 23, 2019

(54) APPARATUS FOR WATER PURIFICATION

(71) Applicant: Vestergaard SA, Lausanne (CH)

(72) Inventors: Mikkel Vestergaard Frandsen, Lausanne (CH); Jean-Luc Madier de Champvermeil, Divonne les Bains (FR); Jean-Marc Pascal, Voreppe (FR)

(73) Assignee: Vastergaard SA, Lausanne (CH)

( * ) Notice: Subject to any disclaimer, the term of this patent is extended or adjusted under 35 U.S.C. 154(b) by 492 days.

(21) Appl. No.: 14/895,969

(22) PCT Filed: Apr. 8, 2015

(86) PCT No.: PCT/DK2015/050083
§ 371 (c)(1),
(2) Date: Dec. 4, 2015

(87) PCT Pub. No.: WO2016/162035
PCT Pub. Date: Oct. 13, 2016

(65) Prior Publication Data
US 2018/0201523 A1 Jul. 19, 2018

(51) Int. Cl.
| C02F 9/02 | (2006.01) |
| C02F 1/44 | (2006.01) |
| B01D 63/02 | (2006.01) |
| C02F 1/00 | (2006.01) |
| C02F 1/28 | (2006.01) |

(Continued)

(52) U.S. Cl.
CPC ............. *C02F 1/444* (2013.01); *B01D 63/02* (2013.01); *B01D 65/02* (2013.01); *C02F 1/002* (2013.01); *C02F 1/281* (2013.01); *C02F 1/283* (2013.01); *C02F 1/42* (2013.01); *B01D 2313/10* (2013.01); *B01D 2313/12* (2013.01); *B01D 2313/21* (2013.01); *B01D 2321/04* (2013.01); *C02F 1/001* (2013.01); *C02F 2303/04* (2013.01); *C02F 2303/16* (2013.01)

(58) Field of Classification Search
CPC .......... C02F 1/002; C02F 1/003; C02F 1/281; C02F 1/283; C02F 1/42; C02F 1/444; C02F 9/005; C02F 2303/04; C02F 2303/16; C02F 1/001; B01D 24/20; B01D 27/02; B01D 35/027; B01D 35/0276; B01D 61/16; B01D 63/02; B01D 2221/02; B01D 65/02; B01D 2313/10; B01D 2313/12; B01D 2313/21; B01D 2321/04

See application file for complete search history.

(56) References Cited

U.S. PATENT DOCUMENTS

| 2,792,942 A | 5/1957 | Feuillet |
| 3,715,035 A | 2/1973 | Teeple |

(Continued)

FOREIGN PATENT DOCUMENTS

| CN | 101595061 A | 12/2009 |
| CN | 203577441 U | 5/2014 |

(Continued)

*Primary Examiner* — Matthew O Savage
(74) *Attorney, Agent, or Firm* — James Creighton Wray; Meera P. Narasimhan

(57) ABSTRACT

An apparatus for water purification comprising a flexible, collapsible water container (2a, 2b) to which a purification unit (4) is connected by a tube (3) for purification of water driven through the purification unit (4) by gravity. The container is produced by welding or gluing a laminate with an overlay region.

9 Claims, 6 Drawing Sheets

(51) Int. Cl.
*C02F 1/42* (2006.01)
*B01D 65/02* (2006.01)

(56) References Cited

U.S. PATENT DOCUMENTS

| | | | |
|---|---|---|---|
| 4,828,698 A | 5/1989 | Jewell | |
| 5,126,044 A | 6/1992 | Magnusson | |
| 5,332,495 A | 7/1994 | Williams | |
| 2005/0035041 A1* | 2/2005 | Nohren, Jr. | A45F 3/16 210/209 |
| 2005/0082320 A1 | 4/2005 | Anue | |
| 2008/0035553 A1 | 2/2008 | Brown | |
| 2010/0044321 A1* | 2/2010 | Vestergaard Frandsen | A47G 21/188 210/754 |
| 2012/0267314 A1* | 10/2012 | Minton-Edison | C02F 1/002 210/695 |
| 2015/0014247 A1 | 1/2015 | Lundquist | |
| 2016/0114271 A1* | 4/2016 | Michaud | C02F 1/003 210/807 |

FOREIGN PATENT DOCUMENTS

| | | |
|---|---|---|
| CN | 204057999 U | 12/2014 |
| EP | 0085474 A2 | 8/1983 |
| WO | 03068689 A1 | 8/2003 |
| WO | 2008067817 A2 | 6/2008 |
| WO | 2008075976 A1 | 6/2008 |
| WO | 2008110172 A2 | 9/2008 |
| WO | 2010138462 A2 | 12/2010 |

* cited by examiner

APPARATUS FOR WATER PURIFICATION

This application claims the benefit of PCT/DK2015/050083 filed Apr. 8, 2015, which is hereby incorporated by reference in their entirety as if fully set forth herein.

FIELD OF THE INVENTION

The present invention relates to a water purification system with a flexible container for water that is driven through a purification unit by gravity. The invention relates further to a method for manufacturing a flexible, collapsible water container by welding or gluing a laminate.

BACKGROUND OF THE INVENTION

Gravity water filtration devices for outdoor adventure have been on the market for years. Popular for transportation in backpacks are devices that comprise a flexible collapsible container for being attached to a tree and having connected a tube at its lower end for driving water through a purification unit by gravity. Some models have a purification unit inside the flexible container and others have it outside the flexible container as part of the tube.

Examples of such bags and other gravity filters are disclosed in U.S. Pat. Nos. 2,792,942; 3,715,035; 4,828,698; 5,126,044; 5,332,495.

Due to market demands, improvements are made on a steady basis, especially because even minor advantages of products with respect to handling and safety have important competitive impact. Thus, there is an ongoing need for improvements, especially, with respect to safety, durability, and versatility in use.

DESCRIPTION/SUMMARY OF THE INVENTION

It is therefore the objective of the invention to provide a general improvement in the art. It is a further objective to provide improvements with respect to safety, durability, and versatility in use. These objectives are achieved with an apparatus for water purification as explained in the following.

The apparatus comprises a flexible, collapsible water container with a container wall made of a flexible sheet-like material. The container has a water inlet at the top, typically, a water inlet that can be closed, and a water outlet at the bottom of the container. A flexible tube is provided with a first end and a second end and with a length of at least 30 cm, for example at least 50 cm or at least 70 cm, between the first end and the second end. The first end is connected to the water outlet and the second end to a water purification unit that comprises purifying media configured for purifying water through removal of bacteria and sub-micron particles by gravity-forced flow of water through the water purification unit. For example, the purification unit is a filtration unit with a porous membrane having pores of a size that prevents sub-micron particles and bacteria, and optionally virus, to traverse the porous membrane.

An example of the porous membrane filter is a bundle of hollow fibre membranes, for example as explained in WO2008/110172, where the hollow fibre membranes are micro-filtration membranes with a porosity of 0.05-04 microns or ultra-filtration membranes with a porosity of 0.01-0.04 microns, the latter not only filtering bacteria but also virus. Other types of porous membranes can be used as well, for example wound membranes. Alternatively, also adsorptive material can be used, such as electropositive attracting fibrous or granular material as well as activated carbon.

Advantageous, a pre-filter chamber is provided at the bottom of the container. The pre-filter chamber comprises an opening towards the interior of the flexible container bag, the opening being in fluid-flow communication with a pre-filter material in the pre-filter chamber for pre-filtering the water prior to entering the tube.

The pre-filter material has a porosity of a predetermined limit preventing particles larger than the predetermined limit to pass the pre-filter material but allowing smaller particles to pass through the pre-filter material and into the tube. Typically, the predetermined limit is a specific size selected from the interval of 20 to 100 microns, for example 50 microns, 80 microns, or a value in between. Examples of materials for the pre-filter are metal meshes, fabrics and porous paper sheets, for example flat sheets. Alternatively, the pre-filter material is an adsorptive material of the electrostatic type. Such a pre-filter material ensures a high flow rate but prevents sand and other relatively large particles to enter the tube and the purification unit. Smaller particles and microbes traverse the pre-filter material and are removed by the purification unit.

In some embodiments, the pre-filter chamber comprises a rigid base and a rigid cap mutually connected, for example by a mutual screw mechanism or bayonet type connection. Thereby, an interior volume is formed inside the pre-filter chamber with the cap forming a ceiling of the interior volume, where the cap is provided inside the flexible container bag. Manually removing the cap from the base gives access to the pre-filter material for manual cleaning of it or for manual exchange of it. For example, the cap is provided with an opening or a plurality of openings that is/are covered, typically on the underside of the cap, by a pre-filter material for pre-filtering the water prior to flow into the interior volume of the pre-filter chamber. In some embodiments, the cap has an upper side that is provided with a plurality of openings covered by the pre-filter material which is a sheet of fabric or paper extending laterally, and optionally flat, across the cap. For example, the sheet is provided at the underside of the cap, such that water has to enter the openings and will thus flow downwards into the pre-filter material.

In some embodiments, the opening or openings of the pre-filter chamber is/are provided at a height of between 1 and 5 cm above the bottom of the flexible container. As the lateral extension of the pre-filter chamber is smaller than the lateral extension of bottom of the flexible container, a volume around the pre-filter chamber is provided at the bottom of the container in which impurities are collected instead of covering and clogging the pre-filter. This is especially so, if the container is periodically moved or shaken, by which impurities are flushed away from the openings with the pre-filter material.

Advantageously, the base is attached irremovably to the container wall at the bottom of the flexible container by a water tight glued or welded connection. For example, the base is provided with a circular shaped collar extending laterally parallel to the bottom and onto which the flexible container wall at the bottom is attached.

Advantageously, the base comprises a connector unit to which the tube is connected for flow of water from the interior volume of the pre-filter chamber through the connector unit into the tube.

In some embodiments, the interior volume of the pre-filter chamber is formed as a torus confined by a pre-filter chamber bottom, a central tubular elevation extending upwards from the pre-filter chamber bottom, and an upstanding wall extending upwards from the pre-filter chamber bottom and surrounding the central tubular elevation. The torus is further confined by the cap which is forming a ceiling for the interior volume of the pre-filter chamber. The central tubular elevation is fluid-flow connected to the connector unit or is part of the connector unit for flow of water from the interior volume of the pre-filter chamber through the central tubular elevation and through the connector unit into the tube.

In some embodiments, the interior volume has a height H from the pre-filter bottom to the cap, and the central tubular elevation comprises an inlet for receiving pre-filtered water from the interior volume, wherein the inlet is provided at a distance D from the cap, the distance D being less than 20% of H, for example less than 10%.

Optionally, the tubular elevation is provided with an inner thread, and a quick connector unit is screw-fastened in this inner thread. Alternatively, the quick connector unit is fastened to the pre-filter chamber by a snap fitting. The quick connector unit comprises a central channel with a resiliently operated snap-lock for receiving and fixing the first end of the tube inside the channel. Optionally, the tube is provided with a cooperating quick connector, although this is not always strictly necessary and depends on the type of quick connector unit. For example, the quick connector unit is provided with a retainer mechanism to tightly fit around a tube without quick connector and retain the tube directly and automatically when the tube is inserted into the quick connector unit.

Optionally, the interior volume of the pre-filter chamber contains a granular purification material comprising at least one of the following: activated carbon, ion exchange resin, zeolites, ferrous hydroxide, ferric oxide, activated alumina. However, despite such granular material, the final filtering or otherwise purification is achieved with the purification unit. The granular material is optionally used to remove arsenic, chlorine, pesticides, various chemicals, and/or traces of heavy metals.

For example, the interior volume comprises a cartridge with the granular purification material or other purification material. Such cartridge makes the granular material easy to exchange or substitute. In order to ensure that the water is flowing through the further purifying media, the direct flow from the cap through the pre-filter material, for example sheet-like pre-filter material, and out of the pre-filter chamber is prevented. This is achieved with the following embodiment. In this embodiment, the cartridge comprises a water impermeable top wall and a water permeable side wall or water permeable bottom wall or both. The top wall extends across the pre-filter material under the cap for guiding the water from the openings in the cap and from the pre-filter material towards the side wall and into the space around the cartridge for forcing the water to flow through the granular material prior to entering the water outlet.

In prior art flexible and collapsible containers of water purification systems, the container has been observed to leak water, especially if the container is made from a laminate of fabric and water-impermeable polymer foil, which is the typical material for such collapsible containers. This leak of water is disadvantageous, why there is a need for a better manufacturing method. A good method for manufacturing such flexible, collapsible water container has been found as described in the following. The method comprising overlaying a first part of the laminate with a second part of the laminate such that the fabric of the first part is abutting the polymer film of the second part. Typically, the laminate is oriented with the water-impermeable polymer film inwards and the fabric outwards. The two abutting parts are then welded or glued together for thereby providing a first attachment between the fabric of the first part and the polymer film of the second part. Further, a piece of water-impermeable polymer film is provided for welding or gluing the piece onto the first polymer film and onto the second polymer film and thereby covering the first attachment for preventing water seepage from inside the water to outside the water container. The attachment of the piece of polymer film can be made after the welding or gluing of the overlaid parts or simultaneously. Or the piece can be attached to the first part after which the second part is overlaid and attached to the first part as well as to the piece.

Useful materials are thermoplastic polymers for the foils, for example thermoplastic polyurethane (TPU), and thermoplastic fabrics, for example nylon (polyamide). Other non-limiting examples of thermoplastic materials are polyester, polyethylene, polypropylene, and polyvinyl.

The term collapsible for the container wall is used to describe a flexible sheet that can be folded or otherwise compacted flexibly into a smaller size, for example in order to fit into a backpack.

SHORT DESCRIPTION OF THE DRAWINGS

The invention will be explained in more detail with reference to the drawing, where FIG. 1 is an image of the water purification system in two variants;

DETAILED DESCRIPTION/PREFERRED EMBODIMENT

Figure 1:
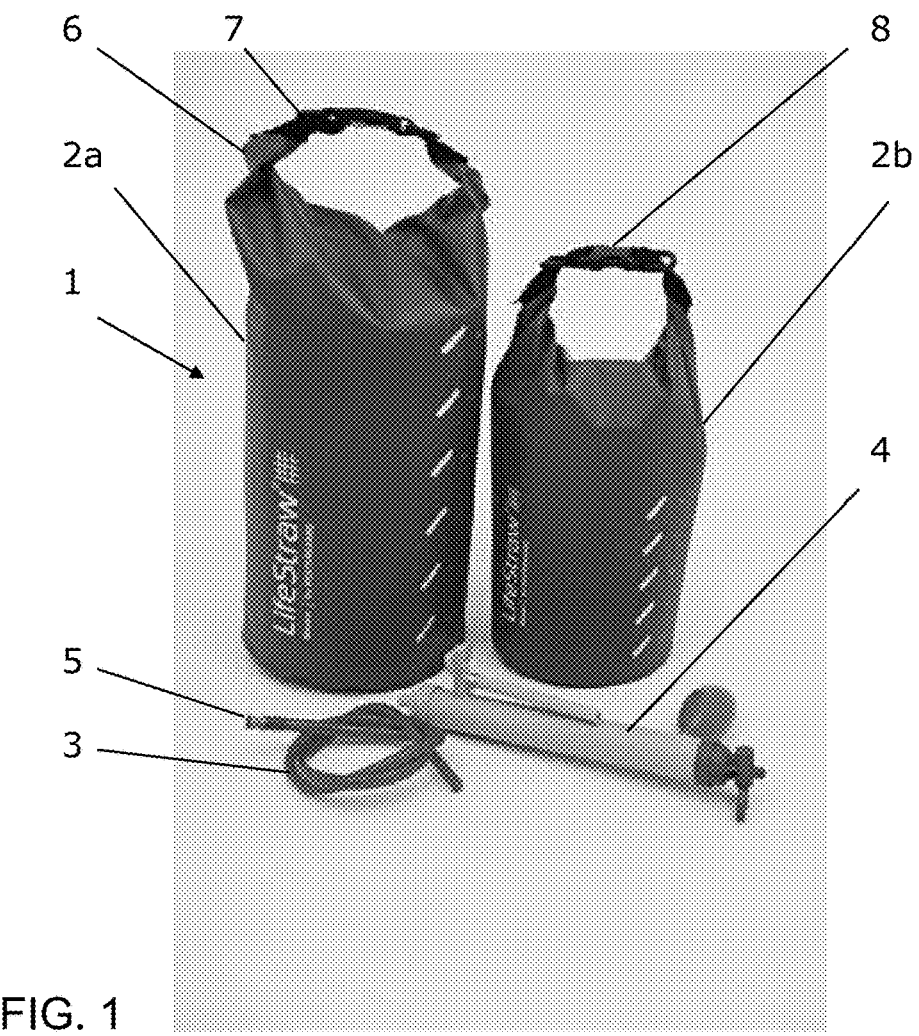

FIG. 1 illustrates a water purification system 1 comprising a flexible water container 2a, 2b, for example with a water content of 12 liter and 5 liter as shown, and further comprising a tube 3 and a purification unit 4. The tube 3 is provided with a quick connector at its first end 5 for quick and easy connection to the flexible water container 2a, 2b. The flexible water container 2a, 2b has a twisted upper part 6 with a strap 7, the strap 7 comprising a snap connector 8 with two releasable cooperating connector parts.

Figure 2:
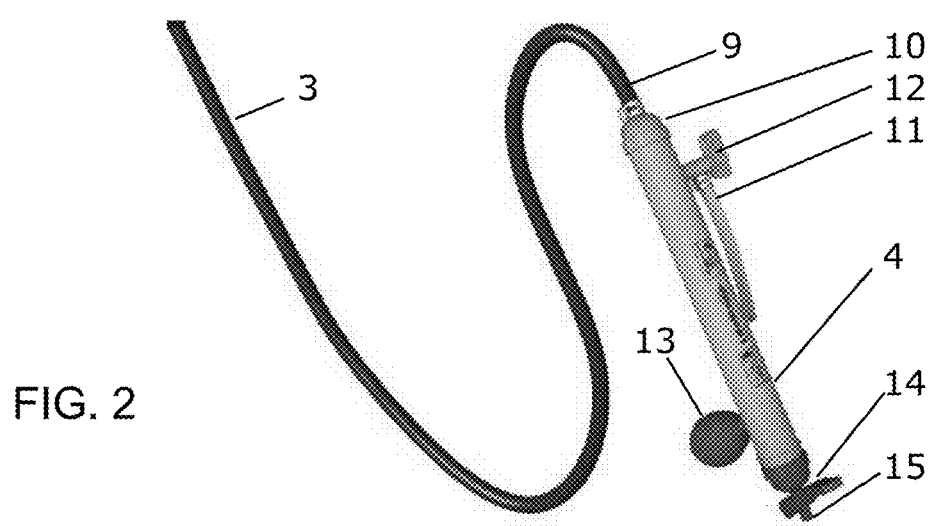
FIG. 2 is an image of the tube with the purification unit in greater detail.

FIG. 2 illustrates the purification unit 4 when connected to the lower end 9 of the tube 3. The purification unit 4 comprises a dirty water inlet 10 and a clean water outlet 11 which is provided with a clean water outlet valve 12. In case where water is provided in the flexible water container 2a, 2b, water will flow by gravity through tube 3 into the upper part of purification unit 4, traverse the purification media inside the purification unit 4, and leave the purification unit 4 after purification through the clean water valve 12 and the clean water outlet 11. Typically, the purification media inside the purification unit comprises a filtration system, for example a microporous membrane, optionally hollow porous capillaries, where the water flows through the pores that retain sub-micron particles and microbes, including bacteria and cysts, and potentially also virus, dependent on the pore size of the membranes, for example microfiltration or ultrafiltration membranes.

Figure 6:
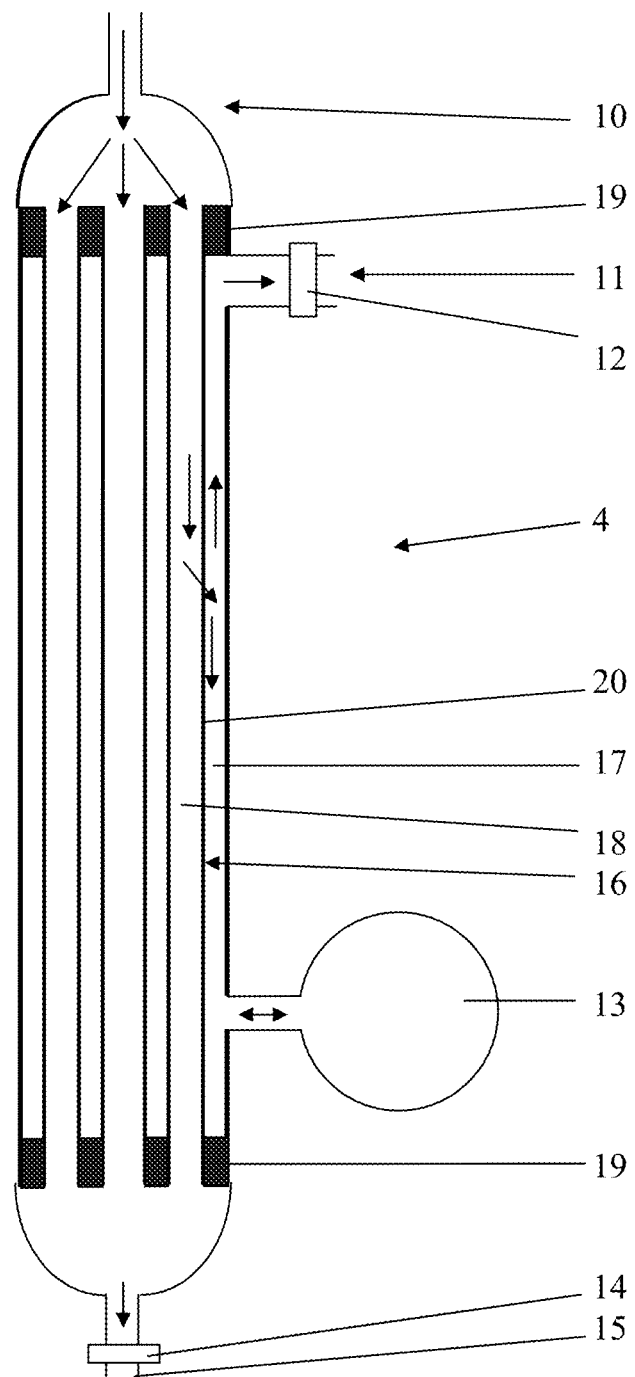
FIG. 6 is an example of a purification unit.

FIG. 6 shows an example of such purification unit 4. With reference to FIGS. 2 and 6, a backwash function is included in the purification unit 4 for cleaning of such a filtration system with membranes that are hollow capillaries 16 with a porous membrane wall 20 that is embedded in a resin plug 19 in both ends of the capillaries. Alternatively, the capillaries 16 could be closed at their second end and only embedded at their first end, or the capillaries could be bent with the bent part extending away from the resin plug. Both inside-out flow or outside-in flow are possible embodiments.

A backwash bulb 13 is connected at the side of the purification unit 4 and fluid-flow connected to downstream side 17 of the hollow porous capillaries 16 for being filled with clean water during the filtration process. By manually compressing the backwash bulb 13, cleaned water is forced out of the bulb 13 and, thereby, backwards from the downstream side 17 of the capillaries 16 through the capillaries 16 and to the upstream side 18 of the capillaries 16. Such backwash results in loosening possible microbes and other particles on the upstream side 18 of the membranes 16. In order to release this material, the purification unit 4 is provided with a flush valve 14 at its lower end. Opening this flush valve 14 results in a forward flushing, where water flows from the tube 3 through the dirty water inlet 10 along the upstream side 18 of the membranes though the flush valve 14 and out of the flush outlet 15.

Figure 3A:
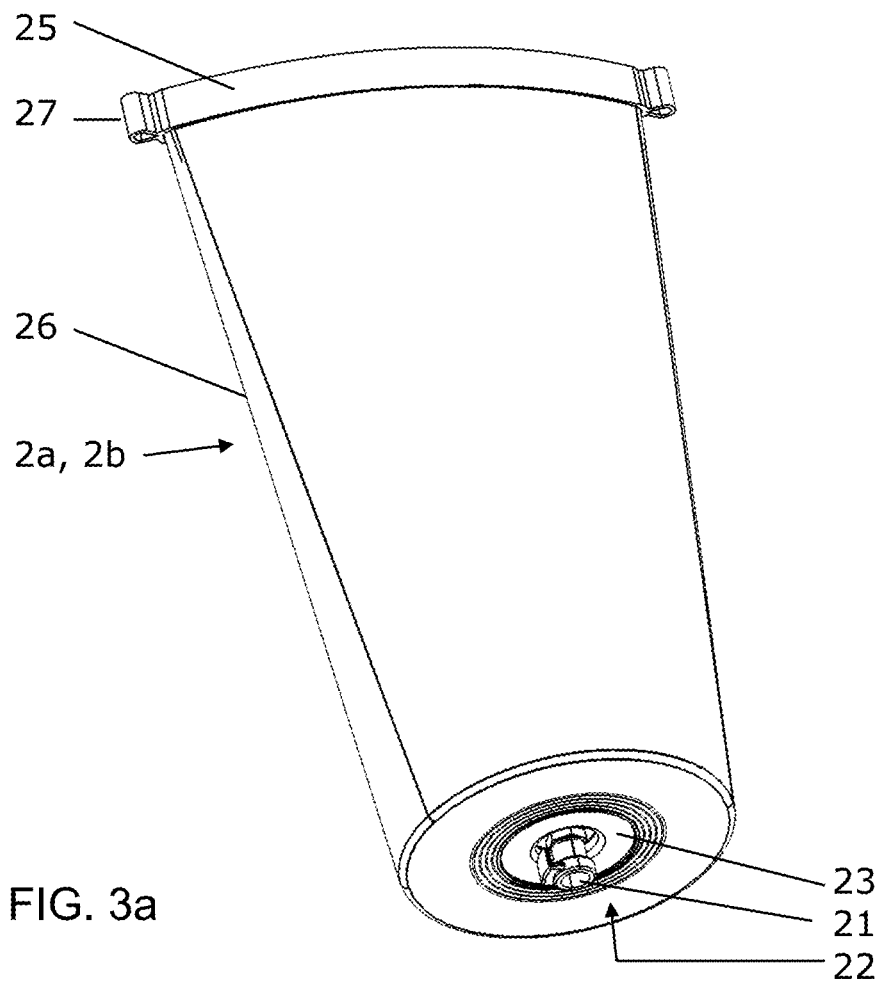
FIG. 3 is a drawing of the water container in a) perspective view and b) top view.

FIG. 3a illustrates the flexible water container 2a, 2b in a perspective view without the strap and with the upper part 6 in an untwisted state. The flat bottom 22 of the flexible water container 2a, 2b is provided with a quick connector unit 21 for cooperation with the quick connector at the first end 5 of the tube 3 for connection with the tube 3. The quick connector unit 21 is part of a pre-filter chamber 23 that is fastened tightly to the bottom 22 of the flexible water container 2a, 2b.

Figure 3B:
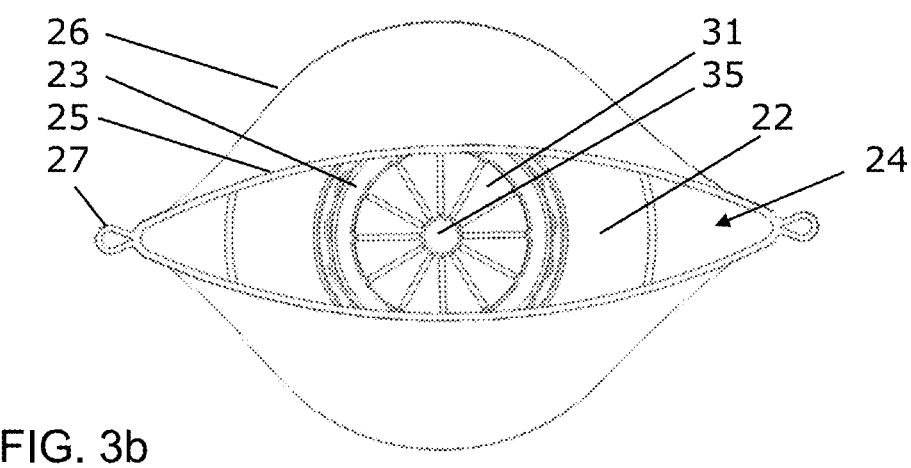

As it appears from FIG. 3b, the upper part 6 of the flexible water container 2a, 2b provides an upper opening 24 when the upper part 6 is in an untwisted state. In FIG. 3b, the pre-filter chamber 23 is illustrated as seen from above through the upper opening 24. The upper part 6 comprises a sleeve 25 of a material that is stiffer than the side walls 26 of the flexible water container 2a, 2b, and which is provided with eyelets 27 for attachments of the strap 7 that is show in FIG. 1.

Figure 4A:
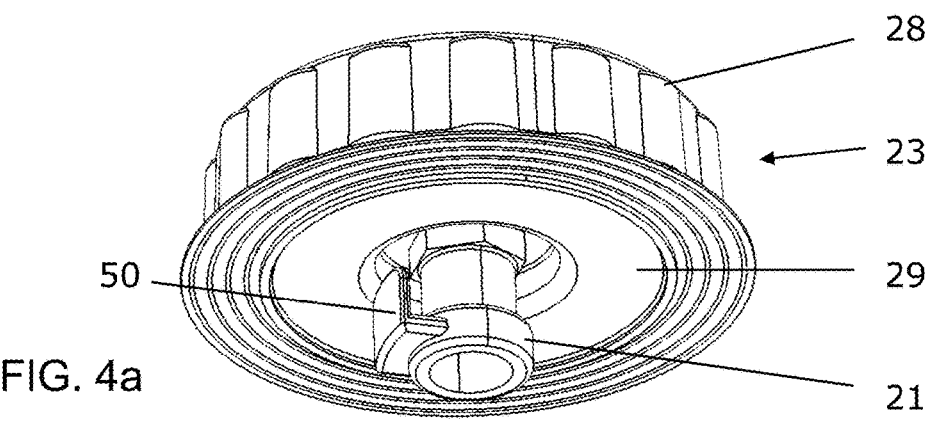
FIG. 4 is a drawing of the pre-filter chamber in a) perspective bottom view, b) perspective top view, and c) perspective cross sectional view.
Figure 4B:
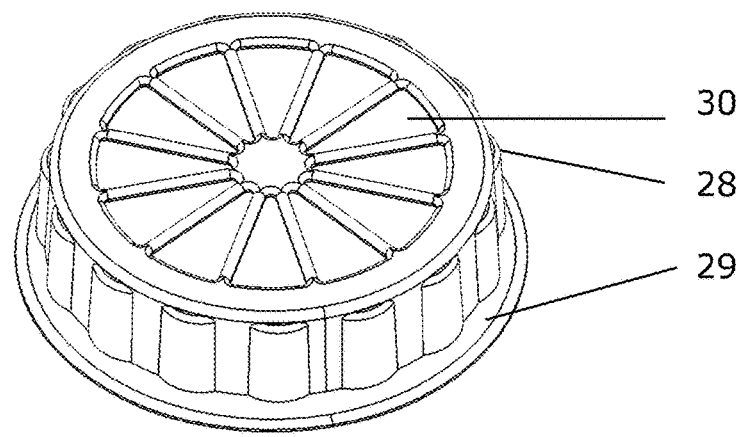

FIG. 4a, b, and c are illustrations of the pre-filter chamber 23, which comprises cap 28 with an internal screw thread 30 and a base 29 with an upstanding wall 39 with a corresponding outer thread such that the cap 28 is screwed onto the base 29, although other attachments are possible as alternatives. The cap 28 comprises openings 31 defined by spokes 34 that are supported by a central support 35. The openings 31 are covered on the underside by a pre-filter material 32, such as a flat porous sheet of paper or fabric, which prevents relatively coarse-sized particles to enter the interior volume 33 of the pre-filter chamber 29. If a fabric is used, this can be a woven or non-woven fabric, for example made of polymer fibres.

The pre-filter material 31 has a porosity of a predetermined limit preventing particles larger than the predetermined limit to pass the pre-filter material 32 but allowing smaller particles to pass through the pre-filter material 32 and into the tube 3. Thus, the pre-filter material is different from the purification media in the purification unit 4, for example the hollow membrane capillaries 16, in that the pre-filter material 32 only retains the larger particles, but the pre-filter material 32 does not retain microbes and sub-micron particles. Typically, the predetermined limit is a specific size selected from the interval of 10 to 120 microns, for example 100 microns, such that only particles and microbes smaller than 100 microns are allowed to pass. For example, the pre-filter is a mesh with pores that have a minimum pore size between 10 and 100 microns. Pre-filters with a porosity preventing particles larger than the predetermined limit to pass, where the predetermined limit is selected from the interval of up to 100 microns, for example 10 to 100 microns, are especially useful if the pre-filter system comprises a porous mesh or membrane and activated carbon in the pre-filter chamber as a further pre-filter step. If the interior volume 33 of the pre-filter chamber does not comprise such activated carbon, the upper limit of the interval can be larger, for example 120 microns. An advantageous interval is, optionally, 50 to 120 microns.

The interior volume 33 of the pre-filter chamber 23 is formed as a torus that is confined downwards by a pre-filter chamber bottom 41 and confined towards the centre by a central tubular elevation 42 extending upwards from the pre-filter chamber bottom 41. Radially outwards, the torus is confined by the upstanding wall 39 extending upwards from the pre-filter chamber bottom 41 and surrounding the central tubular elevation 42. The torus being further confined upwards by the cap 28 with the pre-filter material 32 which is forming a ceiling for the interior volume 33 of the pre-filter chamber 23. The central tubular elevation 42 is fluid-flow connected to the connector unit 21 for flow of water from the interior volume 33 through the central tubular elevation 42 and through the connector unit 21 into the tube 3.

The interior volume 33 of the pre-filter chamber 29 is useful for various further purification media, for example adsorbing media, such as but not limited to activated carbon, or chemical pre-treatment agents, such as but not limited to ion exchange resin or agents that release halogens, especially chlorine or iodine. Advantageous, the further purification media in the pre-filter chamber is granular. This further purification media can be provided as a granular material filled directly into the pre-filter chamber. Alternatively, the further purification media is provided in a cartridge to be inserted into the interior volume of the pre-filter chamber, which makes it easy for the user to exchange.

As illustrated, the torus-shaped interior volume 33 has a height H from the pre-filter bottom 41 to the cap 28. The quick connector unit 21 in combination with the central tubular elevation 42 comprises an inlet 43 for receiving pre-filtered water from the interior volume 33, wherein the inlet 43 is provided at a distance D from the cap, the distance being less than 20% of H, for example less than 10% of H. This way, it is assured that the pre-filtered water is filling the torus with the optional further purification media.

In order to provide a reliable and tight connection between the bottom 22 of the flexible water container 2a, 2b and the pre-filter chamber 23, the base 29 is welded or glued to the container wall material at the flat bottom 22. For a proper connection, the base 29 is provided with a collar 37 laterally to the upstanding wall 39 with the thread 30. This way, the base 23 is largely flush with the bottom 22 of the flexible water container 2a, 2b.

The fact that the removable cap 28 is provided inside the flexible water container 2a, 2b minimizes leakage risks and is, therefore, advantageous over prior art systems where a screw cap is provided outside and below a flexible water container.

The quick connector unit 21 in the base 29 is fastened with a fluid tight threading 36. As illustrated in FIG. 4a, the quick connector unit 21, comprises a snap connector with a lateral slider that is configured for resilient sliding in and out of the female quick connector unit 21 and configured for withholding the quick connector 5 of the tube 3 when inside the quick connector unit 21 and for releasing the quick connector 5 of the tube when, the slider is resiliently pushed into the quick connector unit.

Thus, water can only leave the flexible water container 2a, 2b through the quick connector unit 21. In case that the quick connector 5 of the tube 3 is connected to the quick connector unit 21, the water will fill the tube and flow to the purification unit at the opposite end of the tube 3. However, if the tube 3 is not connected to the quick connector unit 21 via the quick connector 5, it is advantageous to block the central channel 40 of the quick connector unit 5 by a valve (not shown), for example a check valve or a valve opened by the insertion of the first end 5 of the tube 3 into the quick connector unit 21.

As show, the lateral extension of the pre-filter chamber 23 is smaller than the lateral extension of bottom 22 of the container 2a, 2b, and the opening 30 in the cap 28 of the pre-filter chamber 23 is provided at a height, for example between 1 and 5 cm above the bottom 22 of the container 2a, 2b. Thereby a ring-shaped volume is provided around the pre-filter chamber 23 at the bottom 22 for collecting water with impurities beside the pre-filter chamber. The impurities settle at the bottom 22 and are prevented from access to the openings 30. Especially if the container 2a, 2b is moved or shaken, the turbulence of water will result in the impurities being removed from the upper surface of the cap 28, which results in an increased flow through the pre-filter material 32.

Figure 7:
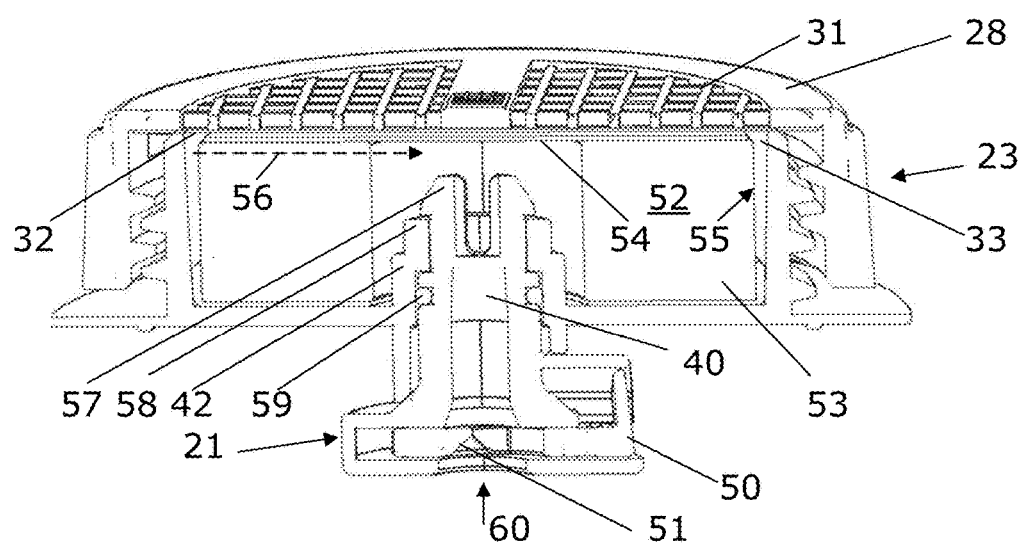
FIG. 7 is a drawing of an alternative pre-filter chamber.

FIG. 7 illustrates an alternative embodiment of a pre-filter chamber 23. The cap 28 is provided with alternative openings 31, which are square. In the interior volume 33 the pre-filter chamber 23, there is provided a cartridge 53 that contains further purifying media 52. The cartridge 53 is provided under the porous pre-filter material 32 and comprises a top wall 54 that prevents water to run directly through the openings and into the central channel 40 which leads to a water outlet 60 for water flowing out of the pre-filter chamber 23. Instead, the water is flowing laterally between the pre-filter material 32 and the top wall 54 until the water reaches the water permeable side wall 55 of the cartridge, at which it enters the cartridge, as shown with arrow 56, and gets into contact with the further purifying media, for example activated carbon, before it leaves the pre-filter chamber through the central channel 40 and the water outlet 60.

Figure 4C:
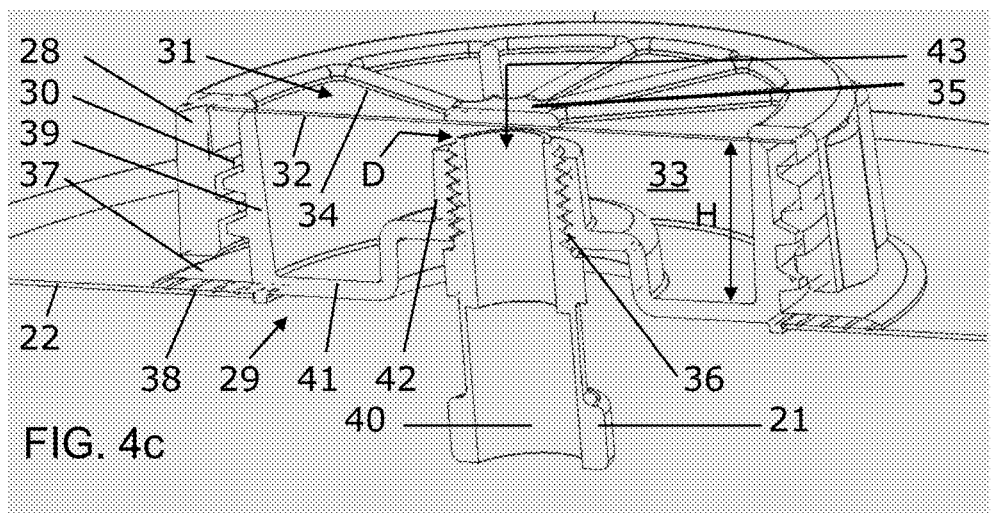

FIG. 7 illustrates also an alternative to the screw head 36 of FIG. 4c. The alternative quick connector unit 21 comprises a snap fitting 57 in which resiliently provided retaining members 57 grab around the upper edge 58 of the central tubular elevation 42. The resilient retaining members 57 are squeezed together when the quick connector unit 21 is pushed into the tubular elevation 42 and expand resiliently for grabbing around the upper edge 58. A gasket 59, here shown as O-ring, provides a tight fitting. The quick connector unit 21, comprises a snap connector with a lateral slider 50 that is configured for resilient sliding in and out of the female quick connector unit 21 and is configured for withholding the first end 5 of the tube 3 with the quick connector by a correspondingly movable edge 51 when the quick connector is pushed inside the quick connector unit 21. Manual pushing of the slider 50 releases the quick connector of the tube 3 from the quick connector unit 21 when the movable slider 50 with its edge 51 is resiliently pushed into the quick connector unit 21.

As a further alternative, which is not shown, the pre-filter chamber is provided without a central elevation 42 but is provided with a similar quick connector unit 21 that is provided outside the pre-filter chamber 23 and which is directed downwards. The interior volume 33 of the pre-filter chamber 23 in this alternative configuration is cylindrical rather than shaped as a torus.

Figure 5A:
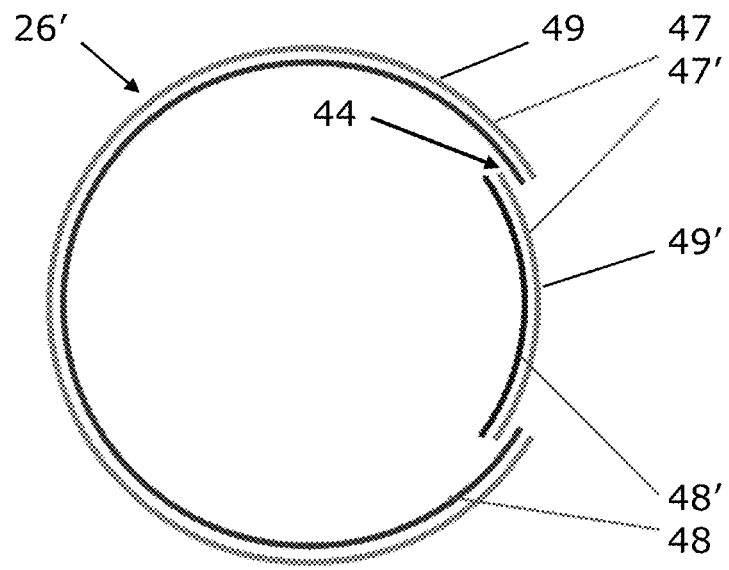
FIG. 5 is a sketch of the welding technique of the water container in a) prior art systems and b) a system according to the invention.

FIG. 5a illustrates a prior art welding principle for a wall 26' of a flexible water container. The wall comprises a fabric 47 and a polymer foil 48 as a laminate 49. When one piece of laminate 49 is welded or glued to another piece of laminate 49' with fabric 47' and foil 48', water can seep through the fabric 47' between the two layers 48, 48' of foil, which is illustrated by arrow 44. It is emphasized that the distance between the fabric 47, 47' and the foil 48, 48' is exaggerated in the drawing for sake of illustration, as the fabric 47, 47' and the foil 48, 48' are abutting each other.

Figure 5B:
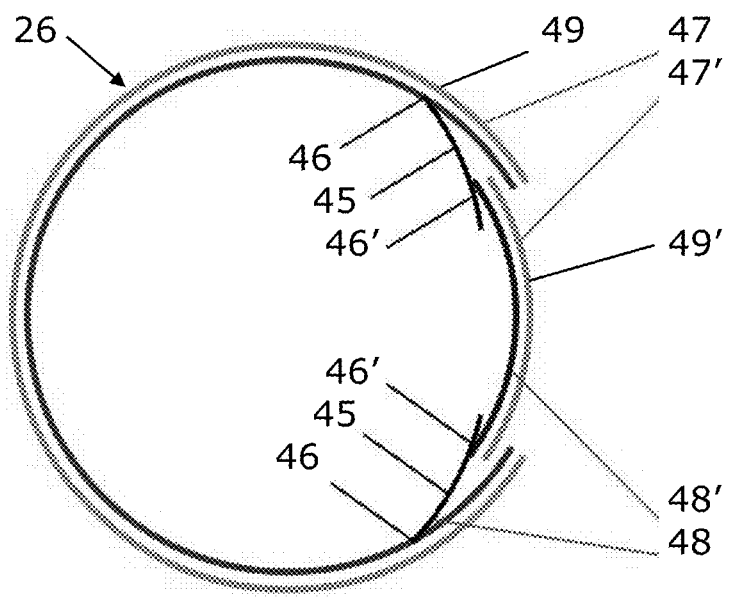

FIG. 5b illustrates an advantageous welding principle for a flexible water container 2a, 2b made of a laminate 49, 49' of fabric 47, 47' for example a woven nylon fabric, and a water impermeable film 48, 48', for example a thermoplastic polyurethane film. In this case, an additional piece 45 of water tight foil is provided over the welding seam 46. The additional piece 45 has a first attachment region 46 at one laminate 49 and a further attachment region 46' at the additional laminate 49', thus connecting the foil 48 of one laminate with the foil 48' of the other laminate 49'. This way, a water tight sealing is achieved, and leakage prevented. The principle as explained is not only useful for the side wall of the flexible water container but also for the bottom 22.

NUMERALS IN DRAWINGS 1 water purification system
2a, 2b flexible water container
3 tube
4 purification unit
5 first upper end of tube 3 with quick connector
6 upper part of container 2a, 26
7 strap
8 snap connector with two releasable cooperating connector parts
9 second lower end of tube 3
10 dirty water inlet of purification unit 4
11 clean water outlet of purification unit 4
12 clean water outlet valve of purification unit 4
13 backwash bulb
14 flush valve at the bottom of the purification unit 4
15 flush outlet
16 hollow porous membrane capillaries
17 downstream side of capillary 16
18 upstream side of capillary
19 resin plug for holding capillaries 16
20 capillary wall
21 quick connector unit for cooperation with the quick connector 5
22 bottom of flexible water container 2a, 2b
23 pre-filter chamber
24 upper opening of flexible water container 2a, 2b
25 sleeve of flexible water container 2a, 2b
26 side wall of the flexible water container 2a, 2b 27 eyelets of sleeve 25 for attachments of strap 7.
28 cap of pre-filter chamber 23
29 base of pre-filter chamber 23
30 thread between cap 28 and base 29
31 openings in cap 28
32 pre-filter material
33 interior volume of pre-filter chamber 29
34 spokes defining openings 31 in cap 28
35 central support for spokes 34
36 screw thread of quick connector 21 in base 29 of pre-filter chamber 23
37 collar of base 29
38 welding or glue between collar 37 and flat bottom 22 of water container 2a, 2b
39 upstanding wall of base 29
40 central channel forming a water outlet
41 bottom of pre-filter chamber 29
42 central tubular elevation
43 water inlet of the quick connector unit 21 in combination with the central tubular elevation 42
44 arrow illustrating seeping of water
45 additional piece of water tight foil
46 welding seam
47 fabric of wall 26, 26'
47' fabric of additional piece 45
48 polymer foil of wall 26, 26'
48' polymer foil of additional piece 45
49 laminate
49' second laminate as part of additional piece 45
50 lateral slider of quick connector unit 21
51 edge of lateral slider 50
52 further purifying media
53 cartridge for further purifying media 52
54 top wall of cartridge 53
55 water permeable side wall of cartridge 53
56 water flow
57 retaining members functioning as a snap lock
58 upper edge of central tubular elevation 42
59 O-ring gasket

The invention claimed is:
1. An apparatus for water purification comprising
a flexible, collapsible water container (2a, 2b) comprising a container wall (22, 26) made of a flexible sheet material, the container (2a, 2b) comprising a water inlet (25) at a top and a water outlet at a bottom (22) of the container (2a, 2b);
a flexible tube (3) comprising a first end (5) and a second end (9) and with a length of at least 30 cm between the first end (5) and the second end (9); wherein the first end (5) is connected to a water outlet (60);
a water purification unit (4) that is connected to the second end (9) of the tube (3) for receiving water from the container (2a, 2b) via the tube (3); the purification unit (4) comprising purifying media (16) configured for purifying water through removal of bacteria and sub-micron particles by gravity-forced flow of water through the water purification unit (4);
further comprising a pre-filter chamber (23) provided at the bottom (22) of the flexible, collapsible container (2a, 2b); the pre-filter chamber (23) comprising an opening towards the interior of the flexible, collapsible water container (2a, 2b), the opening being in fluid-flow communication with a pre-filter material (32) in the pre-filter chamber (23) for pre-filtering the water prior to entering the tube (3); the pre-filter material having a porosity of a predetermined limit preventing particles larger than the predetermined limit to pass the pre-filter material (32) but allowing smaller particles to pass through the pre-filter material (32) and into the tube (3);
wherein the predetermined limit is a specific size selected from the interval of 10 to 120 microns, wherein a lateral extension of the pre-filter chamber (23) is smaller than the lateral extension of bottom (22) of the container (2a, 2b), and wherein the opening (30) of the pre-filter chamber is provided only at a height of between 1 and 5 cm above the bottom (22) of the container (2a, 2b), thereby providing a volume around the pre-filter chamber (23) at the bottom (22) for collecting water with impurities at the bottom (22) without the impurities having access to the opening (30).

2. An apparatus for water purification comprising:
a flexible, collapsible water container (2a, 2b) comprising a container wall (22, 26) made of a flexible sheet material, the container (2a, 2b) comprising a water inlet (25) at a top and a water outlet at a bottom (22) of the container (2a, 2b);
a flexible tube (3) comprising a first end (5) and a second end (9) and with a length of at least 30 cm between the first end (5) and the second end (9); wherein the first end (5) is connected to a water outlet (60);
a water purification unit (4) that is connected to the second end (9) of the tube (3) for receiving water from the container (2a, 2b) via the tube (3); the purification unit (4) comprising purifying media (16) configured for purifying water through removal of bacteria and sub-micron particles by gravity-forced flow of water through the water purification unit (4);
further comprising a pre-filter chamber (23) is provided at the bottom (22) of the flexible, collapsible container (2a, 2b); the pre-filter chamber (23) comprising an opening towards the interior of the flexible, collapsible water container (2a, 2b), the opening being in fluid-flow communication with a pre-filter material (32) in the pre-filter chamber (23) for pre-filtering the water prior to entering the tube (3); the pre-filter material having a porosity of a predetermined limit preventing particles larger than the predetermined limit to pass the pre-filter material (32) but allowing smaller particles to pass through the pre-filter material (32) and into the tube (3);
wherein the predetermined limit is a specific size selected from the interval of 10 to 120 microns, wherein a lateral extension of the pre-filter chamber (23) is smaller than the lateral extension of bottom (22) of the container (2a, 2b), and wherein the opening (30) of the pre-filter chamber is provided only at a height of between 1 and 5 cm above the bottom (22) of the container (2a, 2b), thereby providing a volume around the pre-filter chamber (23) at the bottom (22) for collecting water with impurities at the bottom (22) without the impurities having access to the opening (30), wherein the pre-filter chamber (23) comprises a rigid base (29) and a rigid cap (28) mutually connected to form an interior volume (33) inside the pre-filter chamber (23); wherein the cap (28) forms a ceiling of the interior volume (33) and is provided inside the flexible container bag (2a, 2b); and wherein the cap (28) is provided manually removable from the base (29) for manual access to the pre-filter material (32); wherein the base (29) is attached irremovably to the container wall (26) at the bottom (22) of the flexible container (2a, 2b) by a water tight glued or welded connection (38); wherein the base (29) comprises a connector unit (21) to which the tube (3) is connected for flow of water from the interior volume (23) of the pre-filter chamber (23) through the connector unit (21) into the tube (3).

3. An apparatus according to claim 2, wherein the cap (28) is provided with the opening and wherein the opening is covered by the pre-filter material (32) for pre-filtering the water prior to flow into the interior volume (33) of the pre-filter chamber (23).

4. An apparatus according to claim 3, wherein the cap (28) has an upper side that is provided with a plurality of openings and an underside of the cap that is covered by the pre-filter material (32), which is a sheet of fabric or paper extending laterally across the cap.

5. An apparatus according to claim 2, wherein the interior volume (33) of the pre-filter chamber (23) is formed as a torus confined by a pre-filter chamber bottom (41), a central tubular elevation (42) extending upwards from the pre-filter chamber bottom (41), and an upstanding wall (39) extending upwards from the pre-filter chamber bottom (41) and surrounding the central tubular elevation (42), and the torus being further confined by the cap (28) which in combination with the pre-filter material is forming the ceiling for the interior volume (33) of the pre-filter chamber (23); wherein the central tubular elevation (42) is fluid-flow connected to the connector unit (21) or is part of the connector unit (21) for flow of water from the interior volume (33) through the central tubular elevation (42) and through the connector unit (21) into the tube (3).

6. An apparatus according to claim 5, wherein the interior volume (33) has a height H from a bottom of the pre-filter to the cap (28), and wherein a quick connector unit (21) in combination with the central tubular elevation (42) comprises an inlet (43) for receiving pre-filtered water from the interior volume (33), the inlet (43) being provided at a distance D from the cap, the distance being less than 20% of H.

7. An apparatus according to claim 2, wherein a quick connector unit (21) is fastened to the pre-filter chamber (23), the quick connector unit (21) comprising a central channel (40) with a resiliently operated snap-lock (50, 51) for receiving and fixing a cooperating quick connector at the first end (5) of the tube (3) inside the central channel (40).

8. An apparatus according to claim 2, wherein the interior volume (33) of the pre-filter chamber (23) contains a granular purification material comprising at least one of the following: activated carbon, ion exchange resin, zeolites, ferrous hydroxide, ferric oxide, activated alumina.

9. An apparatus according to claim 8, wherein the interior volume (33) comprises a cartridge (53) with the granular purification material (52), the cartridge comprising a water impermeable top wall (54), a water permeable side wall (55) extending across the pre-filter material (32) for guiding the water from the openings (31) in the cap (28) and from the pre-filter material (32) towards a side wall and around the cartridge (53) for water flow (56) through the granular material (52) prior to entering the water outlet (60).

* * * * *